United States Patent
Ahn et al.

(10) Patent No.: US 7,105,367 B2
(45) Date of Patent: Sep. 12, 2006

(54) METHOD OF MANUFACTURING ARRAY SUBSTRATE FOR LIQUID CRYSTAL DISPLAY DEVICE

(75) Inventors: Jae-Jun Ahn, Gyeongsangbuk-do (KR); Hee-Young Kwack, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/964,970

(22) Filed: Oct. 15, 2004

(65) Prior Publication Data

US 2005/0142679 A1 Jun. 30, 2005

(30) Foreign Application Priority Data

Dec. 30, 2003 (KR) .................. 10-2003-0100605
Oct. 8, 2004 (KR) .................. 10-2004-0080235

(51) Int. Cl.
*H01L 21/00* (2006.01)
(52) U.S. Cl. .......................... 438/30; 257/59
(58) Field of Classification Search ............ 438/30
See application file for complete search history.

(56) References Cited

U.S. PATENT DOCUMENTS

| 6,760,092 B1* | 7/2004 | Yoo et al. .................. 349/187 |
| 6,924,179 B1* | 8/2005 | Oh et al. .................. 438/157 |
| 6,924,852 B1* | 8/2005 | Choi .................. 349/40 |

\* cited by examiner

*Primary Examiner*—Thao P. Le
(74) *Attorney, Agent, or Firm*—Morgan, Lewis & Bockius, LLP

(57) ABSTRACT

A method of manufacturing an array substrate for a liquid crystal display device includes forming a first line on a substrate; the first line having one or more first holes; forming a first insulating layer on the first line; forming a second line on the first insulating layer, the second line crossing the first line; forming a second insulating layer on the second line, the second insulating layer including one or more second holes; and forming a conductive pattern in each of the second holes, wherein the first holes are formed at a crossing portion of the first and the second lines, and the second holes at the crossing portion are disposed in the first holes.

17 Claims, 8 Drawing Sheets

METHOD OF MANUFACTURING ARRAY SUBSTRATE FOR LIQUID CRYSTAL DISPLAY DEVICE

This application claims the benefit of the Korean Patent Application Nos. 2003-00100605 filed on Dec. 30, 2003 and 2004-0080235 filed on Oct. 8, 2004, which are both hereby incorporated by reference for all purposes as if fully set forth herein.

BACKGROUND OF THE INVENTION

1. Field of the Invention

The present invention relates to a liquid crystal display (LCD) device and more particularly, to a method of manufacturing an array substrate for the liquid crystal display device.

2. Discussion of the Related Art

In general, a liquid crystal display (LCD) device includes two substrates, which are spaced apart and facing each other, and a liquid crystal layer interposed between the two substrates. Each of the substrates includes electrodes. The electrodes of each substrate are also facing each other. Voltage is applied to each electrode such that an electric field is induced between the electrodes. Alignment of the liquid crystal molecules is changed by the varying intensity or direction of the electric field. The LCD device displays a picture by varying transmittance of the light according to the arrangement of the liquid crystal molecules.

An LCD device has pixels arranged in a matrix. An LCD device having a thin film transistor and a pixel electrode in each of the pixels is referred to as an active matrix LCD (AM-LCD) device. Such a device is widely used due to its high resolution and capacity to realize fast moving images.

In an LCD device, a pixel electrode can be formed on a lower substrate, which can be referred to as an array substrate, and a common electrode can be formed on an upper substrate, which can be referred to as a color filter substrate. Thus, an electric field induced between the pixel electrode and the common electrode is perpendicular to the substrates. Such an LCD device has high transmittance and a high aperture ratio. Further, breakdown of such an LCD device due to electrostatic discharge can be prevented because the common electrode functions as a ground.

FIG. 1 is an expanded perspective view illustrating the related art LCD device. The related art LCD device has a first substrate 22 and a second substrate 5, which are spaced apart from and facing each other, and also has a liquid crystal layer 14 interposed between the first substrate 22 and the second substrate 5. At least one gate line 13 and at least one data line 15 are formed on an inner surface of the first substrate 22 (i.e., the side facing the second substrate 5). The gate line 13 and the date line 15 cross each other and define a pixel region P.

A thin film transistor T is formed adjacent to each crossing of the gate line 13 and the data line 15. The thin film transistor T includes a gate electrode, a source electrode and a drain electrode. A pixel electrode 17, which is electrically connected to the thin film transistor T, is formed in the pixel region P on the first substrate 22. The pixel electrode 17 can be formed of a transparent conductive material, such as indium-tin-oxide (ITO), that transmits light relatively well. A plurality of such thin film transistors is arranged in a matrix form to correspond to other crossings of gate and data lines. The first substrate 22, which includes the thin film transistor T and the pixel electrode 17, is typically referred to as an array substrate.

A black matrix 6 is formed on an inner surface of the second substrate 5. The black matrix 6 has an opening that corresponds to the pixel electrode 17. A color filter layer 7 is formed in the opening of the black matrix 6. The color filter layer 7 includes three color filters 7a, 7b and 7c of red(R), green(G) and blue(B), which are sequentially arranged, and each color filter corresponds to one pixel electrode 17. A common electrode 18 is formed on the color filter layer 7. The common electrode 18 can be formed of a transparent conductive material, such as indium-tin-oxide (ITO), that transmits light relatively well. The second substrate 5, which includes the color filter layer 7, is typically referred to as a color filter substrate.

The array substrate of the LCD device is manufactured by repeatedly performing processes of depositing a thin film and patterning the thin film through a photolithographic process using a mask, i.e., a mask process. The photolithography process includes the steps of cleaning, coating a photo-resist layer, exposing through a mask, developing the photo-resist layer, and etching. Therefore, fabricating time, costs, and failure can be decreased by reducing the number of the photolithography processes.

SUMMARY OF THE INVENTION

Accordingly, the present invention is directed to a method of manufacturing an array substrate for a liquid crystal display device that substantially obviates one or more problems due to limitations and disadvantages of the related art.

An advantage of the present invention is to provide a method of manufacturing an array substrate for a liquid crystal display device that increases productivity because of shorter processes and lower cost.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of manufacturing an array substrate for a liquid crystal display device includes forming a first line on a substrate; the first line having one or more first holes; forming a first insulating layer on the first line; forming a second line on the first insulating layer, the second line crossing the first line; forming a second insulating layer on the second line, the second insulating layer including one or more second holes; and forming a conductive pattern in each of the second holes, wherein the first holes are formed at a crossing portion of the first and the second lines, and the second holes at the crossing portion are disposed in the first holes.

In another aspect of the present invention, a method of manufacturing an array substrate for a liquid crystal display device includes forming gate lines, gate electrodes, and a first shorting bar connected to each other on a substrate through a first mask process, wherein the first shorting bar has one or more first holes; forming an auxiliary line parallel to the first shorting bar; forming data lines, source electrodes, drain electrodes, active layers, a second shorting bar, and a jumping line on the substrate including the gate lines, the gate electrodes, and the first shorting bar through a second mask process, wherein the gate lines and the data lines cross each other to define pixel regions, the second shorting bar is disposed at an opposite side of the auxiliary line with respect to the first shorting bar, and the jumping line crosses the first shorting bar and connects the second shorting bar with the auxiliary line; forming a passivation layer on the substrate including the data lines, the source electrodes, the drain electrodes, the second shorting bar, and the jumping line through a third mask process, the passivation layer having openings and one or more second holes, the openings corresponding to the pixel regions; and forming pixel electrodes in the openings and a conductive pattern in each of the second holes, wherein the first holes are formed at a crossing portion of the first shorting bar and the jumping line, and the second holes at the crossing portion are disposed in the first holes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to embodiments of the present invention, which are illustrated in the accompanying drawings.

Figure 1:
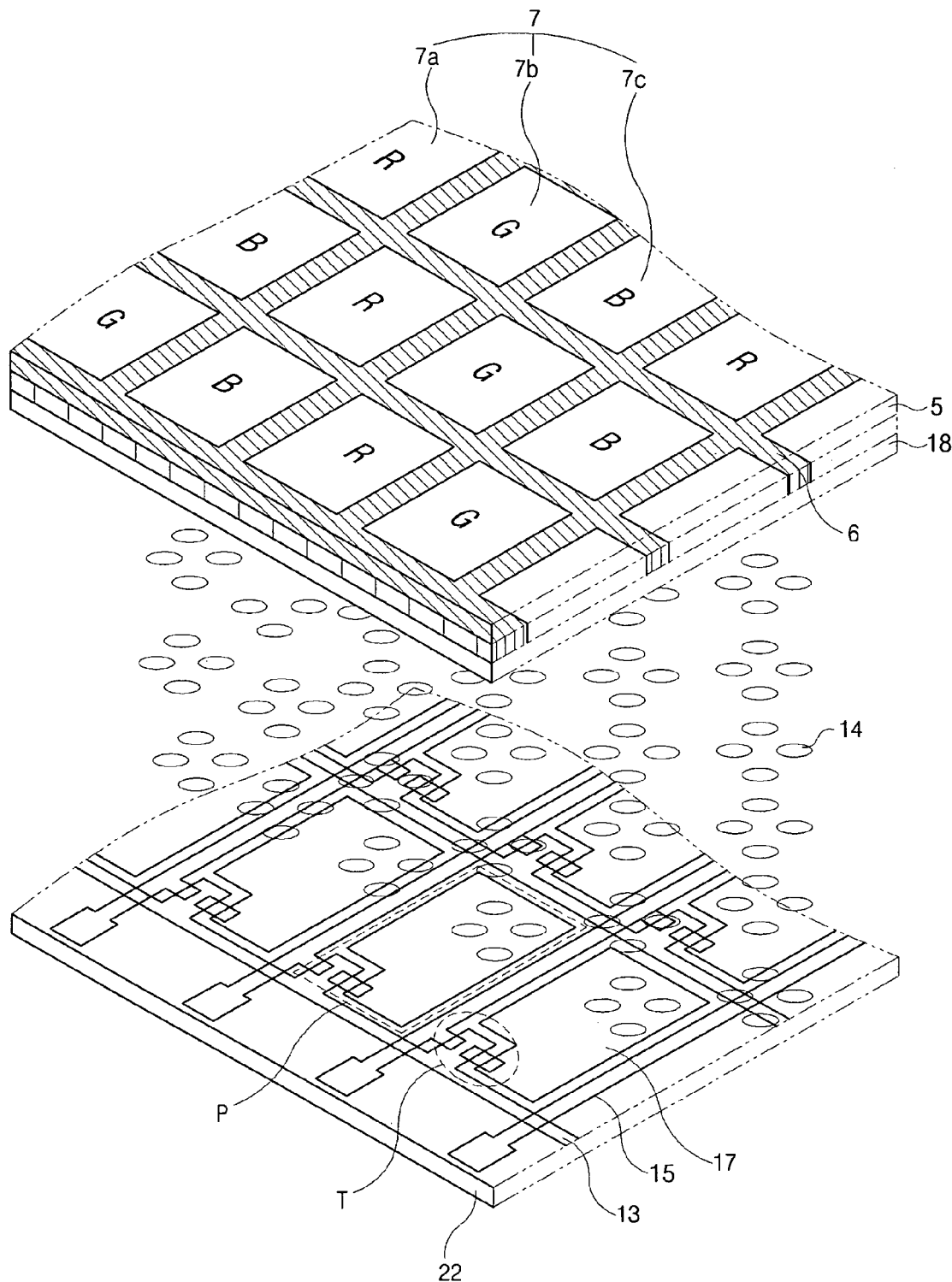
FIG. 1 is an expanded perspective view illustrating a related art liquid crystal display (LCD) device.
Figure 2A:
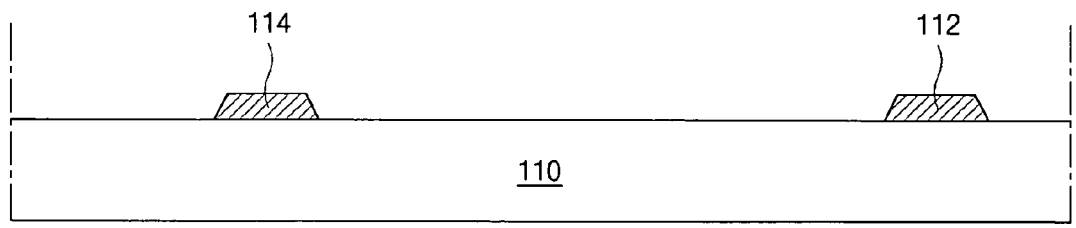
FIGS. 2A to 2G are cross-sectional views illustrating a method of manufacturing an array substrate according to an embodiment of the present invention.

FIGS. 2A to 2G are cross-sectional views illustrating a method of manufacturing an array substrate according to an embodiment of the present invention. As illustrated in FIG. 2A, a gate line 112 and a gate electrode 114 are formed on a transparent insulating substrate 110 by depositing a first metal layer and then patterning the first metal layer through a first photolithographic process using a first mask, i.e., a first mask process. The gate line 112 is formed in a first direction and the gate electrode 114 extends from the gate line 112.

Figure 2B:
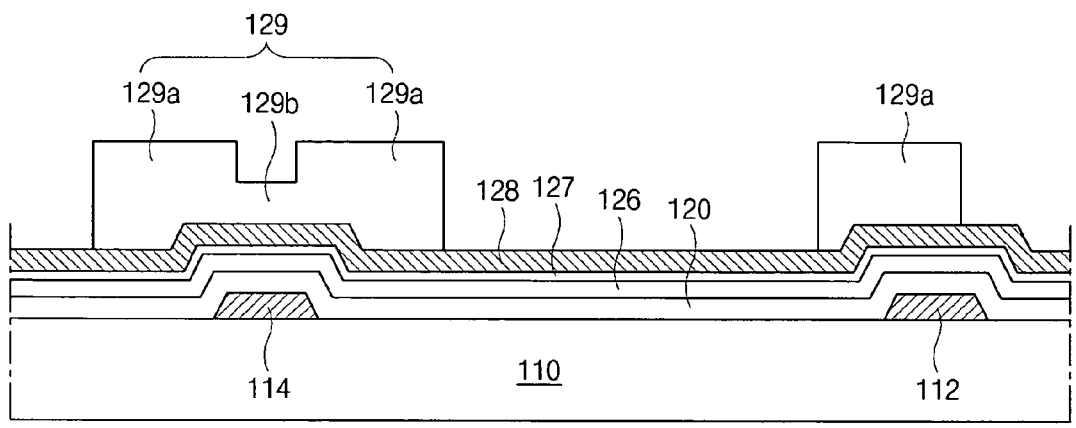

As illustrated in FIG. 2B, a gate insulating layer 120, an amorphous silicon layer 126, an impurity-doped amorphous silicon layer 127 and a second metal layer 128 are subsequently deposited on the substrate 110 having the gate line 112 and the gate electrode 114 thereon. The gate insulating layer 120 is formed of an inorganic insulating material, such as silicon nitride (SiNx) and silicon oxide ($SiO_2$). The gate insulating layer 120 can be formed of an organic insulating material, such as benzocyclobutene (BCB) and acrylic resin. The second metal layer 128 is formed of one of chromium, molybdenum, tungsten and tantalum (Ta).

Next, a first photoresist pattern 129 is formed on the second metal layer 128 by coating photoresist and then exposing and developing the photoresist using a second mask. The first photoresist pattern 129 has different thickness. A first thickness of the first photoresist pattern 129a corresponds to portions where a data line, a source electrode, a drain electrode, and a capacitor electrode are formed in later processes. A second thickness of the first photoresist pattern 129b corresponds to a portion between the source electrode and the drain electrode. The first thickness 129a is thicker than the second thickness 129b. To form the first photoresist pattern 129 having two different thickness, the second mask can include slits or half-transmittance film corresponding to the second thickness of the first photoresist pattern 129b.

Figure 2C:
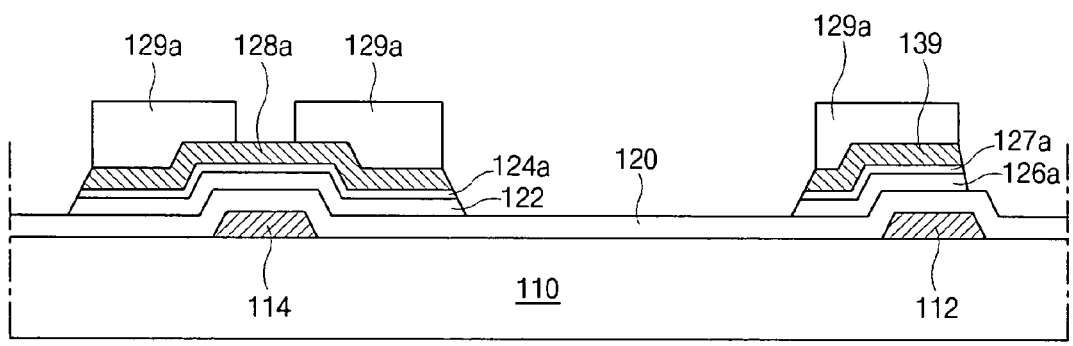

As illustrated in FIG. 2C, a data line (not shown), a source/drain pattern 128a, a capacitor electrode 139, an impurity-doped semiconductor pattern 124a, and an active layer 122 are formed by patterning the second metal layer 128, the impurity-doped amorphous silicon layer 127, the amorphous silicon layer 126 of FIG. 2B using the first photoresist pattern 129 of FIG. 2B as an etching mask. The source/drain pattern 128a is connected to the data line, and the capacitor electrode 139 is disposed over the gate line 112. The active layer 122, the impurity-doped semiconductor pattern 124a, and the source/drain pattern 128a are sequentially disposed over the gate electrode 114. An amorphous silicon pattern 126a and an impurity-doped amorphous silicon pattern 127a are formed under the capacitor electrode 139. Although not shown in FIG. 2C, semiconductor patterns including amorphous silicon and impurity-doped amorphous silicon are also formed under the data line. The semiconductor patterns have the same shape as the data line.

Next, the second thickness of the first photoresist pattern 129b shown in FIG. 2B is removed by an ashing method, to thereby expose a portion of the source/drain pattern 128a. At this time, the first thickness of the first photoresist pattern 129a is partially removed.

Figure 2D:
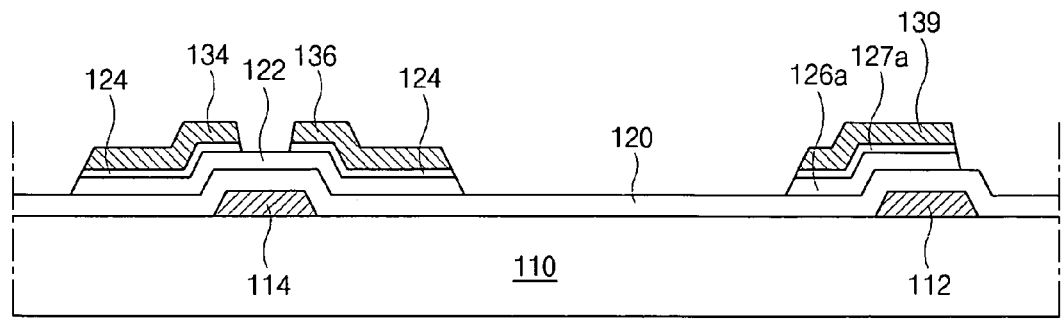

As illustrated in FIG. 2D, a source electrode 134 and a drain electrode 136 are formed by removing the exposed portion of the source/drain pattern 128a of FIG. 2C, and then the impurity-doped semiconductor pattern 124a of FIG. 2C exposed by the source electrode 134 and the drain electrode 136 is removed such that an ohmic contact layer 124 is completed. The remaining first photoresist pattern 129a is then removed.

Figure 2E:
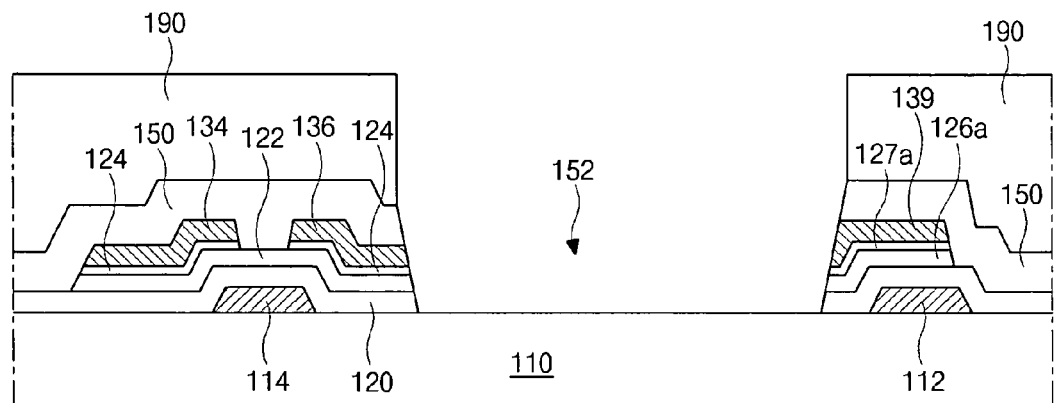

As illustrated in FIG. 2E, a passivation layer 150 is formed by depositing an inorganic material, such as silicon nitride and silicon oxide, or by coating an organic insulating material. A second photoresist pattern 190 is formed on the passivation layer 150 by coating photoresist and then exposing and developing the photoresist using a third mask. Next, the passivation layer 150 and the gate insulating layer 120 are etched by using the second photoresist pattern 190 as an etching mask, to thereby form an opening 152 exposing the substrate 110.

The passivation layer 150 can be etched by a dry etching method. At this time, if the source and drain electrodes 134 and 136 are formed of molybdenum (Mo), the source and drain electrodes 134 and 136 can also be removed. Thus, portions of the drain electrode 136, the ohmic contact layer 124, the active layer 122, the capacitor electrode 139, the impurity-doped amorphous silicon pattern 127a, and the amorphous silicon pattern 126a, which correspond to the opening 152, are removed, to thereby expose sides of the drain electrode 136 and the capacitor electrode 139.

Figure 2F:
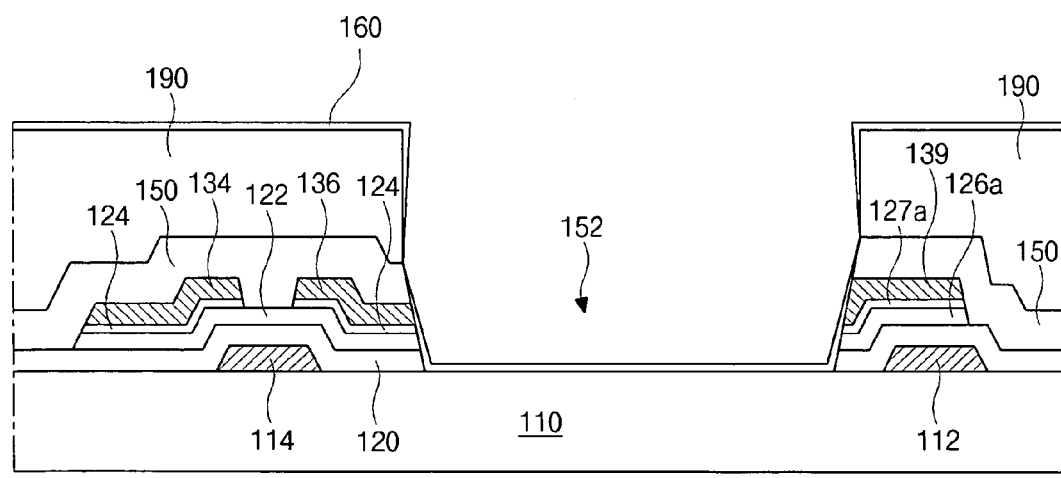
Figure 2G:
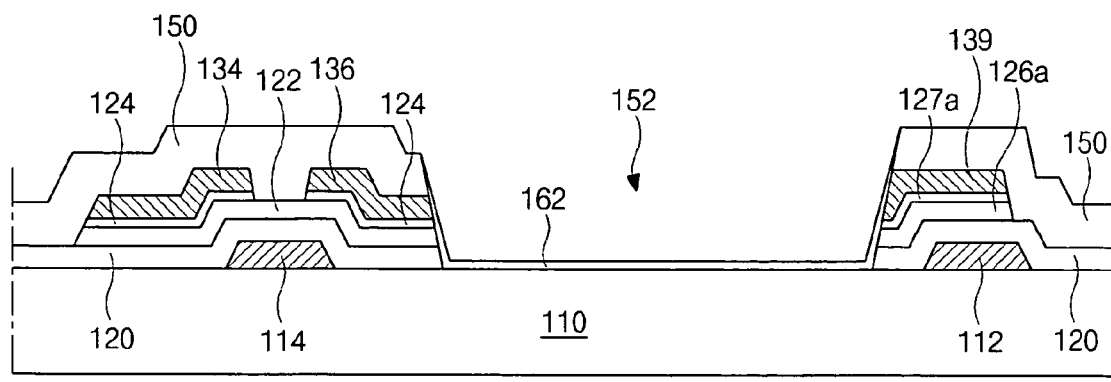

A transparent conductive material 160 such as indium-tin-oxide is deposited on the substrate 110 including the second photoresist pattern 190, as shown in FIG. 2F. Then, the second photoresist pattern 190 is removed by a lift-off method. At this time, portions of the transparent conductive material 160 disposed directly on the second photoresist pattern 190 are removed. Thus, as illustrated in FIG. 2G, a pixel electrode 162 is formed in the opening 152. The pixel electrode 162 contacts the exposed sides of the drain electrode 136 and the capacitor electrode 139 and also contacts the substrate 110.

Since the array substrate in an embodiment of the present invention are manufactured by using three masks, manufacturing time and costs are reduced and the productivity is improved.

Generally, a glass substrate is used as a substrate of the LCD device, and electrostatic discharge may occur during the manufacturing processes and may remain locally in the glass substrate or in patterns formed on the glass substrate. Although the electrostatic discharge has very small quantity of electric charge, the electrostatic discharge can cause a high voltage because the electrostatic discharge is locally concentrated. Therefore, elements such as thin film transistors may be damaged due to the electrostatic discharge. To prevent the damage of the thin film transistors, shorting bars connected to every line may be formed so that all of the lines have the equivalent potential.

Figure 3:
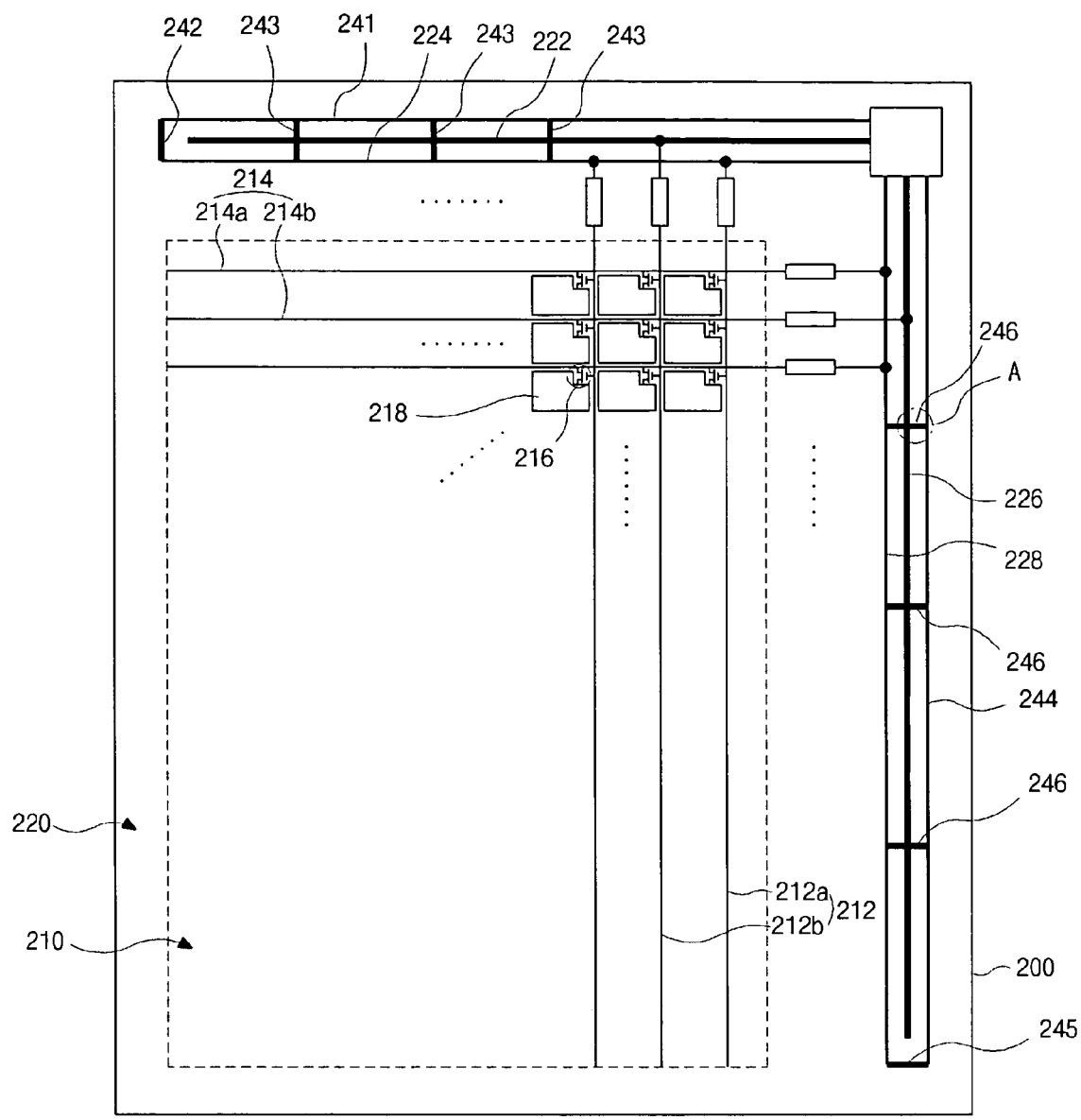
FIG. 3 is a schematic plan view of an array substrate for an LCD device according to an embodiment of the present invention.

FIG. 3 is a schematic plan view of an array substrate for an LCD device according to an embodiment of the present invention. The array substrate is manufactured through the processes discussed with regard to FIGS. 2A to 2G.

As illustrated in FIG. 3, a display region 210 displaying an image and a non-display region 220 outside the display region 210 are defined on an insulating substrate 200. In the display region 210, a plurality of gate lines 212 and a plurality of data lines 214 cross each other and define pixel regions. A thin film transistor 216 is formed as a switching element in each pixel region adjacent to where gate and data lines 212 and 214 cross. A pixel electrode 218 is also formed in each pixel region and is connected to the thin film transistor 216.

In the non-display region 220, a first gate shorting bar 222, a second gate shorting bar 224, a first data shorting bar 226 and a second data shorting bar 228 are formed. The first gate shorting bar 222 is connected to even gate lines 212b and the second gate shorting bar 224 is connected to odd gate lines 212a. The first data shorting bar 226 is connected to even data lines 214b and the second data shorting bar 228 is connected to odd data lines 214a. The first and second gate shorting bars 222 and 224 and the first and second data shorting bars 226 and 228 make all of the lines have the equivalent potential, and thus prevent elements from being damaged due to an electrostatic discharge during the subsequent manufacturing processes. The first and second gate shorting bars 222 and 224 and the first and second data shorting bars 226 and 228 can also be used for testing of the array substrate, and can be removed later. The first gate shorting bar 222 and the first data shorting bar 226 are formed of the same material as the gate lines 212 and the second gate shorting bar 224 and the second data shorting bar 228 are formed of the same material as the data lines 214.

By the way, the second gate shorting bar 224 and the second data shorting bar 228, which are formed of the same material as the data lines 214, have larger resistances than the first gate shorting bar 222 and the first data shorting bar 226, which are formed of the same material as the gate lines 212. Thus, when signals are applied, there is a difference between signals at both ends of each of the second gate shorting bar 224 and the second data shorting bar 228. That is, the signals at one end to the other end where the signals are applied are delayed rather than them at the end where the signals are applied. To compensate such a signal delay, a gate auxiliary line 241 and a data auxiliary line 244 are further formed. An end of the gate auxiliary line 241 is connected to an end of the second gate shorting bar 224 through a gate connecting line 242, and an end of the data auxiliary line 244 is connected to an end of the second data shorting bar 228 through a data connecting line 245. In addition, gate jumping lines 243, which cross the first gate shorting bar 222, connect the second gate shorting bar 224 with the gate auxiliary line 241 between both ends of the second gate shorting bar 224 and data jumping lines 246, which cross the first data shorting bar 226, connect the second data shorting bar 228 with the data auxiliary line 244 between both ends of the second data shorting bar 228, so that signals are uniformly supplied at all parts of the shorting bars.

The gate jumping lines 243 and the data jumping lines 246 are formed of the same material as the data lines 214. The gate auxiliary line 241 and the data auxiliary line 244 are formed of the same material as either the gate lines 212 or the data lines 214. The gate jumping lines 243 and the data jumping lines 246 may be formed between portions where driver integrated circuits are attached in a later process.

Figure 4:
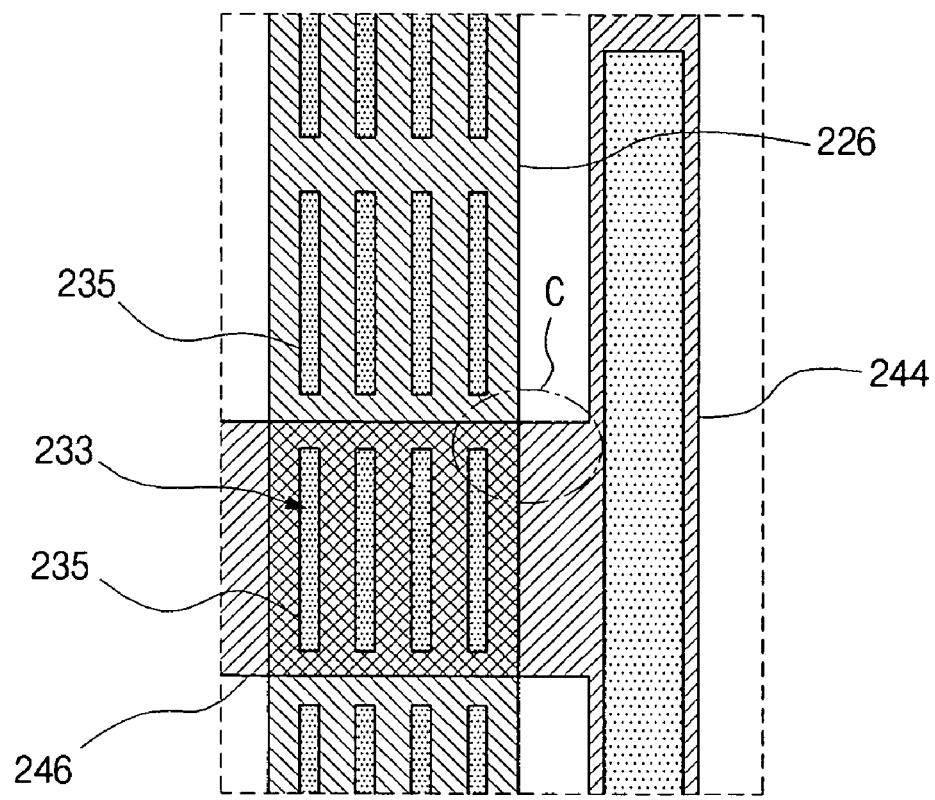
FIG. 4 is an enlarged plan view of the region A in FIG. 3.

FIG. 4 is an enlarged plan view of the region A in FIG. 3. As shown in FIG. 4, to connect the data auxiliary line 244 and the second data shorting bar 228 of FIG. 3, which are disposed at both sides of the first shorting bar 226, the data jumping line 246 crosses the first data shorting bar 226. A passivation layer (not shown) having a plurality of holes 233 is formed over the first data shorting bar 226, the second data shorting bar 228 of FIG. 3, the data auxiliary line 244, and the data jumping line 246. Conductive patterns 235 may be formed in the holes 233. The plurality of holes 233 are used for completely removing the second photoresist pattern and unnecessary conductive materials on the second photoresist pattern in the non-display region 220 of FIG. 3 when the pixel electrode is formed by a lift-off method, and are formed at an interval of several tens micrometers (μm) in the non-display region 220 of FIG. 3. Since the first data shorting bar 226 and the data jumping line 246 may have a width of about 400 micrometers (μm), some holes 233 can be formed over the first data shorting bar 226 and the data jumping line 244, and particularly, can be formed where the first data shorting bar 226 crosses the data jumping line 246. When the holes 233 are formed where the first data shorting bar 226 crosses the data jumping line 246, the first data shorting bar 226 and the data jumping line 246 can be electrically shorted due to the holes 233.

Figure 5:
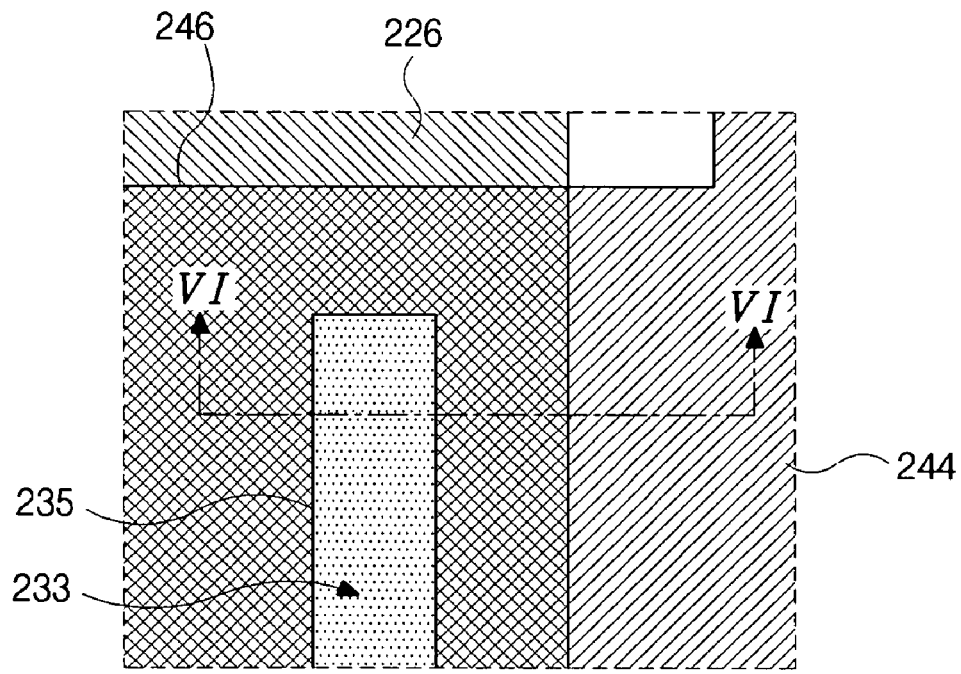
FIG. 5 is an enlarged view of the region C in FIG. 4.
Figure 6:
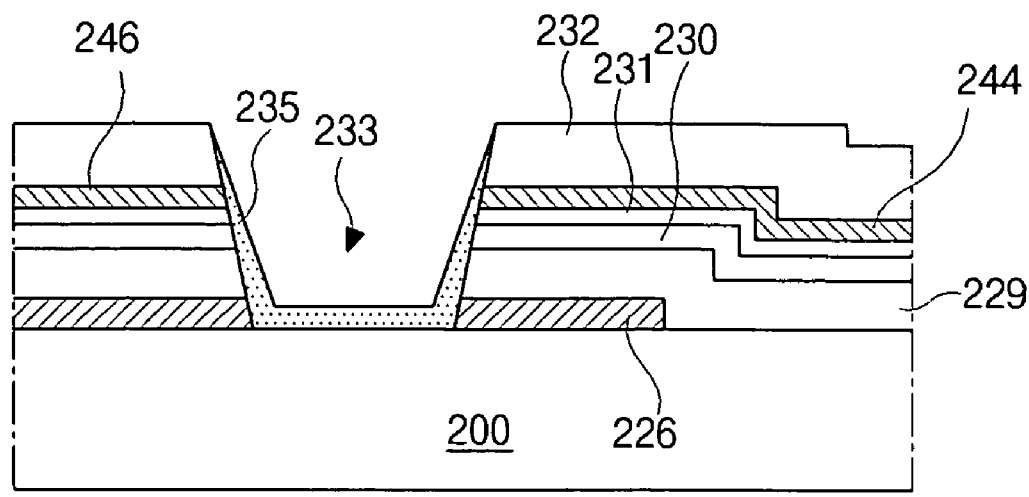
FIG. 6 is a cross-sectional view taken along the line VI—VI in FIG. 5.

FIG. 5 is an enlarged view of the region C in FIG. 4, and FIG. 6 is a cross-sectional view taken along the line VI—VI in FIG. 5. As illustrated in FIGS. 5 and 6, the first data shorting bar 226 is formed on an insulating substrate 200 and a gate insulating layer 229 is formed on the first data shorting bar 226. The first data shorting bar 226 is formed of the same material and the same layer as a gate line (not shown), and is connected to even data lines (not shown) to be formed later. An amorphous silicon pattern 230, an impurity-doped amorphous silicon pattern 231, and the data jumping line 246 and the data auxiliary line 244 are sequentially formed on the gate insulating layer 229. The data jumping line 246 crosses the first data shorting bar 226 and connects the second data shorting bar (not shown) with the data auxiliary line 244. The data jumping line 246, the second data shorting bar, and the data auxiliary line 244 are formed of the same material and the same layer as data lines (not shown), and the second data shorting bar is connected to odd data lines. The amorphous silicon pattern 230, the impurity-doped amorphous silicon pattern 231, and the data jumping line 246 and the data auxiliary line 244 are formed through one photolithographic process, and thus have the same shape.

A passivation layer 232 is formed on the data jumping line 246 and the data auxiliary line 244. As stated above, to remove unnecessary conductive materials when the pixel electrode (not shown) is formed, the passivation layer 232 has a hole 233. A conductive pattern 235 of the same material as the pixel electrode is formed in the hole 233. Here, when the passivation layer 232 is patterned, the layers under the passivation layer 232 are also etched. Thus, the data jumping line 246, the impurity-doped amorphous silicon pattern 231, the amorphous silicon pattern 230, and the gate insulating layer 229 corresponding to the hole 233 of the passivation layer 232 are removed.

At this time, a portion of the first data shorting bar 226 corresponding to the hole 233 may also be removed such that a side of the data jumping line 246 may be exposed. The exposed side of the data jumping line 246 may be connected to a side of the first data shorting bar 226, which is exposed by the hole 233, through the conductive pattern 235 formed in the hole 233. To prevent an electrical short between a data jumping line connected to the second data shorting bar and the data auxiliary line and the first data shorting bar, the first data shorting bar may have a hole larger than the hole in the passivation.

Figure 7:
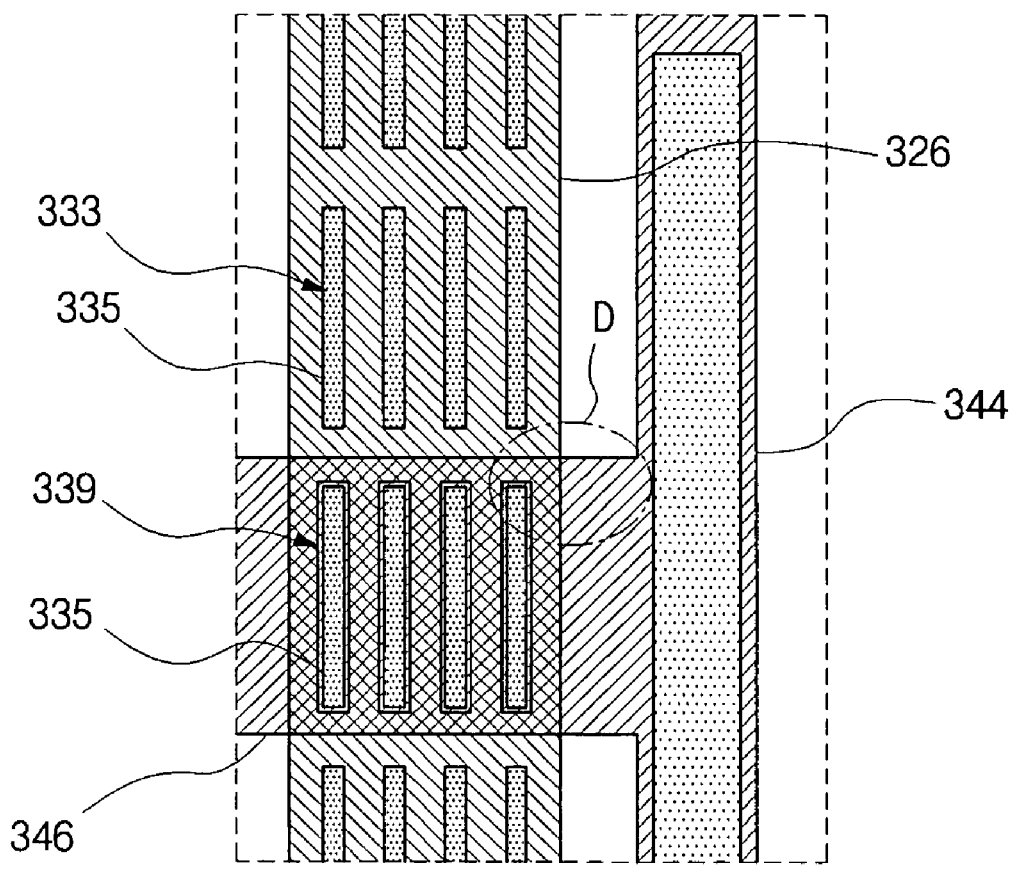
FIG. 7 is a view illustrating a shorting bar arrangement according to an embodiment of the present invention.

FIG. 7 is a view illustrating shorting bar arrangement according to another embodiment of the present invention. As illustrated in FIG. 7, a first data shorting bar 326 and a data auxiliary line 344 are formed parallel to each other. A data jumping line 344 crosses a portion of the first data shorting bar 326, and connects a second data shorting bar (not shown) with the data auxiliary line 344. Thus, the data jumping line 346 has a portion where the data jumping line 346 crosses the first data shorting bar 326. The first data shorting bar 326 has first holes 339 where the data jumping line 346 crosses the first shorting bar 326. A passivation layer (not shown) is formed on the first data shorting bar 326, the data jumping line 346 and the data auxiliary line 344, and the passivation layer has a plurality of second holes 333. A conductive pattern 335 is formed in each second hole 333. Of the plurality of second holes 333, some of the second holes 333 that are disposed where the data jumping line 326 crosses the first data shorting bar 326 correspond to the first holes 339 and are disposed in the first holes 339.

Figure 8:
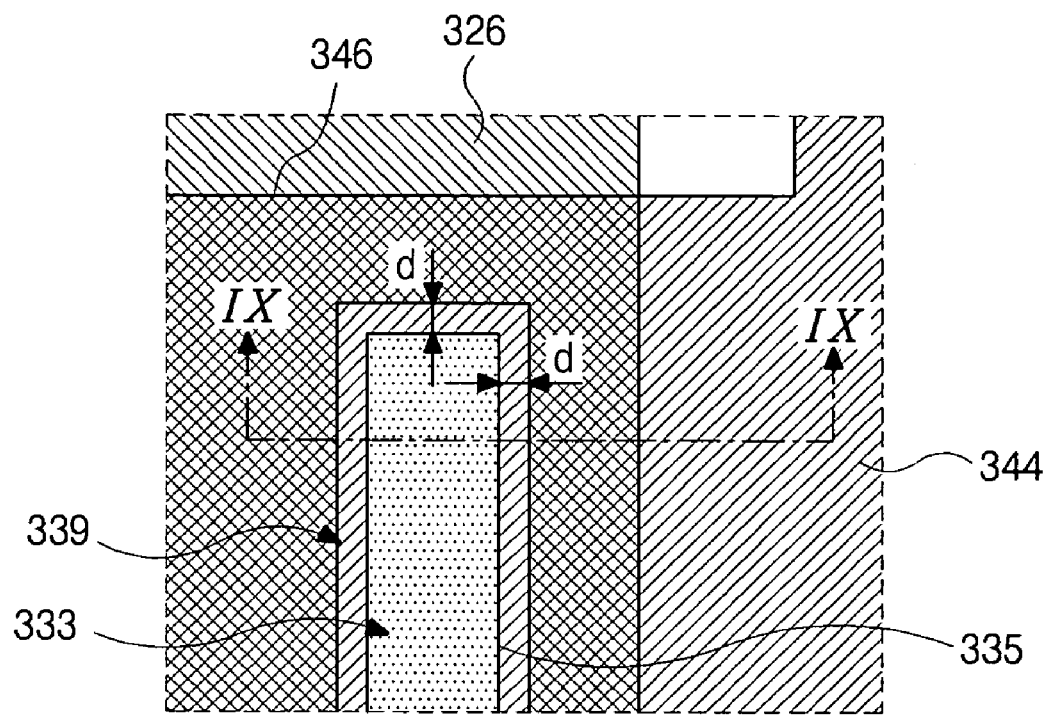
FIG. 8 is an enlarged view of the region D in FIG. 7.
Figure 9:
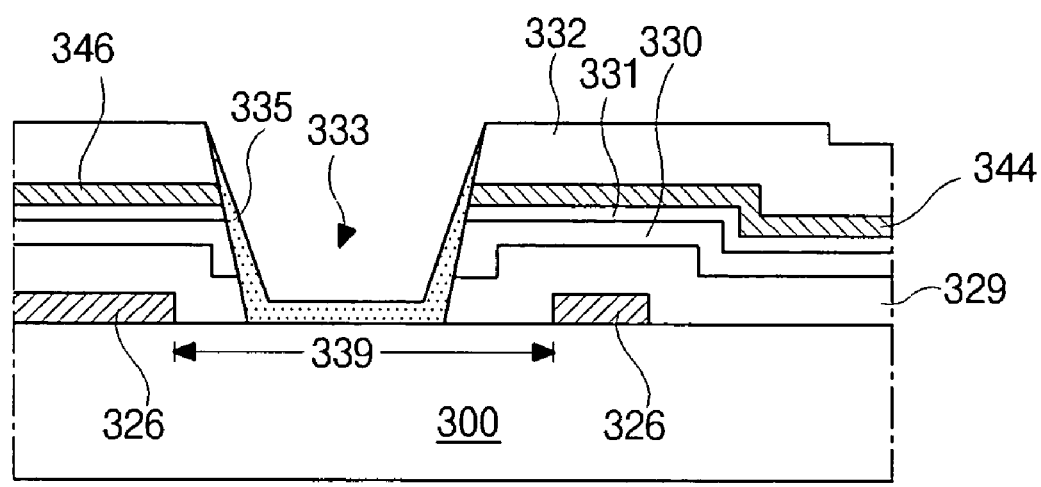
FIG. 9 is a cross-sectional view taken along the line IX—IX in FIG. 8.

FIG. 8 is an enlarged view of the region D in FIG. 7, and FIG. 9 is a cross-sectional view taken along the line IX—IX in FIG. 8. As illustrated in FIGS. 8 and 9, a first data shorting bar 326 is formed on an insulating substrate 300. The first data shorting bar 326 is formed of the same material and the same layer as a gate line (not shown), and is connected to even data lines (not shown). The first data shorting bar 326 has a first hole 339. A gate insulating layer 329 is formed on the first data shorting bar 326, and an amorphous silicon pattern 330, an impurity-doped amorphous silicon pattern 331, and a data jumping line 346 and a data auxiliary line 344 are sequentially formed on the gate insulating layer 329. The data jumping line 346 crosses the first data shorting bar 326 and connects a second data shorting bar (not shown) with the data auxiliary line 344. The data jumping line 346, the second data shorting bar and the data auxiliary line 344 are formed of the same material and the same layer as data lines (not shown) and the second data shorting bar is connected to odd data lines. The amorphous silicon pattern 330, the impurity-doped amorphous silicon pattern 331 and the second data shorting bar 328 are formed through one photolithographic process, and thus have the same shape.

A passivation layer 332 is formed on the data jumping line 346 and the data auxiliary line 344. The passivation layer 332 has a second hole 333, which is disposed in the first hole 339. The data jumping line 346, the impurity-doped amorphous silicon pattern 331, the amorphous silicon pattern 330, and the gate insulating layer 329 are removed to form the second hole 333 so as to expose the substrate 300 and sides of the data jumping line 346. A conductive pattern 335 of the same material and the same layer as a pixel electrode (not shown) is formed in the second hole 333. The conductive pattern 335 contacts the sides of the data jumping line 346 and the substrate 300.

The first hole 339 of the first data shorting bar 326 is larger than the second hole 333. A distance d between an outside edge of the first hole 339 and an outside edge of the second hole 333 can be about 10 micrometers. In other words, the diameter of the first hole 339 can be 10 micrometers larger than the diameter of the second hole 333.

In embodiments of the present invention, although the data jumping line 346 corresponding to the second hole 333 may be etched, an electrical short between the first data shorting bar 326 and the data jumping line 346 can be prevented by forming a first hole 339 in the first data shorting bar 326 that is larger than the second hole 333. The above structure may be also used in gate shorting bars, which have the same structure as the data shorting bars.

To fabricate a liquid crystal display device, a cell process will be performed with the array substrate including the gate shorting bars and the data shorting bars. That is, alignment layers for initial arrangement of liquid crystal molecules are formed on the array substrate and a color filter substrate, respectively. A seal pattern is formed on one of the array substrate and the color filter substrate, and spacers are spread or spacer patterns are formed on the other. The seal pattern makes a gap for injecting liquid crystal and prevents leakage of the injected liquid crystal. The spacers or spacer patterns maintain a space between the array substrate and the color filter substrate uniform. Then, the array substrate and the color filter substrate are arranged and attached by pressure-resistant hardening of the seal pattern.

To improve manufacturing efficiency and reduce manufacturing costs, a plurality of unit cells, each of which will become a liquid crystal display device, are formed on a substrate. An attached liquid crystal substrate including the array substrate and the color filter substrate is divided into unit cells. A portion where the gate shorting bars and the data shorting bars are formed may be cut and removed during the cell cutting process. Next, a liquid crystal material is injected into each unit cell, and then polarization films and driving circuits are attached to the unit cell to thereby complete a liquid crystal display device. The gate shorting bars and the data shorting bars may be removed before attaching the array substrate and the color filter substrate.

In embodiments of the present invention, the array substrate is manufactured using three masks. Therefore, the manufacturing method of the array substrate according to the present invention decreases the processes and the cost, and increases productivity. Additionally, damage due to electrostatic discharge can be prevented by forming shorting bars. As discussed above, electrical shorts between shorting bars can be prevented.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A method of manufacturing an array substrate for a liquid crystal display device, comprising:
    forming a first line on a substrate, the first line having one or more first holes;
    forming a first insulating layer on the first line;
    forming a second line on the first insulating layer, the second line crossing the first line;
    forming a second insulating layer on the second line, the second insulating layer having one or more second holes; and
    forming a conductive pattern in each of the second holes,
    wherein the first holes are disposed at a crossing portion of the first and the second lines, and the second holes at the crossing portion are in the first holes.

2. The method according to claim 1, wherein a distance between an outside edge of the first hole and an outside edge of the second hole at the crossing portion is about 10 micrometers.

3. The method according to claim 1, wherein the forming a second line includes forming a semiconductor pattern under the second line, the semiconductor pattern having the same shape as the second line.

4. The method according to claim 1, wherein the forming a second insulating layer includes removing the second line and the first insulating layer corresponding to the second holes to expose side portions of the second line and the substrate.

5. The method according to claim 1, wherein the conductive pattern contacts side portions of the second line.

6. A method of manufacturing an array substrate for a liquid crystal display device, comprising:
    forming gate lines, gate electrodes, and a first shorting bar connected to each other on a substrate through a first mask process, wherein the first shorting bar has one or more first holes;
    forming an auxiliary line parallel to the first shorting bar;
    forming data lines, source electrodes, drain electrodes, active layers, a second shorting bar, and a jumping line on the substrate including the gate lines, the gate electrodes, and the first shorting bar through a second mask process, wherein the gate lines and the data lines cross each other to define pixel regions, the second shorting bar is disposed at an opposite side of the auxiliary line with respect to the first shorting bar, and the jumping line crosses the first shorting bar and connects the second shorting bar with the auxiliary line;
    forming a passivation layer on the substrate including the data lines, the source electrodes, the drain electrodes, the second shorting bar, and the jumping line through a third mask process, the passivation layer having openings and second holes, the openings corresponding to the pixel regions; and
    forming pixel electrodes in the openings and a conductive pattern in each of the second holes,
    wherein the first holes are formed at a crossing portion of the first shorting bar and the jumping line, and the second holes at the crossing portion are disposed in the first holes.

7. The method according to claim 6, wherein the forming a passivation layer includes depositing an insulating layer, forming a photoresist pattern on the insulating layer, and patterning the insulating layer using the photoresist pattern as an etching mask.

8. The method according to claim 7, wherein the forming pixel electrodes and conductive patterns includes forming a conductive material on the substrate including the photoresist pattern and removing the photoresist pattern and the conductive material on the photoresist pattern by a lift-off method.

9. The method according to claim 7, wherein the patterning the insulating layer includes removing the jumping line to expose side portions of the jumping line.

10. The method according to claim 9, wherein the conductive patterns contact the sides of the jumping line.

11. The method according to claim 6, wherein a distance between an outside edge of the first hole and an outside edge of the second hole at the crossing portion is about 10 micrometers.

12. The method according to claim 6, further comprising removing the first and second shorting bars, the auxiliary line, and the jumping line after forming the pixel electrode and the conductive pattern.

13. The method according to claim 6, wherein the first shorting bar is connected to (2n)th gate lines (n is an integer) and the second shorting bar is connected to (2n−1)th gate lines.

14. The method according to claim 6, wherein the first shorting bar is connected to (2n)th data lines (n is an integer) and the second shorting bar is connected to (2n−1)th data lines.

15. The method according to claim 6, wherein the openings exposing sides of the drain electrodes and the pixel electrodes contacts sides of the drain electrodes.

16. The method according to claim 6, wherein the auxiliary line and the first shorting bar are formed at the same time.

17. The method according to claim 6, wherein the auxiliary line and the second shorting bar are formed at the same time.

* * * * *